(12) United States Patent
Nagase et al.

(10) Patent No.: US 8,606,412 B2
(45) Date of Patent: Dec. 10, 2013

(54) METHOD FOR DETECTING MALFUNCTION OF VALVE ON THE DOWNSTREAM SIDE OF THROTTLE MECHANISM OF PRESSURE TYPE FLOW CONTROL APPARATUS

(75) Inventors: Masaaki Nagase, Osaka (JP); Ryousuke Dohi, Osaka (JP); Nobukazu Ikeda, Osaka (JP); Kouji Nishino, Osaka (JP); Kaoru Hirata, Osaka (JP); Katsuyuki Sugita, Osaka (JP); Atsushi Matsumoto, Osaka (JP)

(73) Assignee: Fujikin Incorporated, Osaka (JP)

( * ) Notice: Subject to any disclaimer, the term of this patent is extended or adjusted under 35 U.S.C. 154(b) by 1374 days.

(21) Appl. No.: 12/307,554

(22) PCT Filed: Jun. 13, 2007

(86) PCT No.: PCT/JP2007/000630
§ 371 (c)(1),
(2), (4) Date: Jan. 5, 2009

(87) PCT Pub. No.: WO2008/004334
PCT Pub. Date: Jan. 10, 2008

(65) Prior Publication Data
US 2009/0292399 A1    Nov. 26, 2009

(30) Foreign Application Priority Data
Jul. 3, 2006    (JP) .................................. 2006-183061

(51) Int. Cl.
*G05D 7/00*    (2006.01)
(52) U.S. Cl.
USPC ............................ 700/282; 700/281; 700/301

(58) Field of Classification Search
USPC .................................. 700/275, 281, 282, 301
See application file for complete search history.

(56) References Cited

U.S. PATENT DOCUMENTS

| | | | |
|---|---|---|---|
| 5,669,408 A | 9/1997 | Nishino et al. | |
| 6,125,869 A | 10/2000 | Horiuchi | |
| 6,302,130 B1 | 10/2001 | Ohmi et al. | |
| 6,314,992 B1 | 11/2001 | Ohmi et al. | |
| 6,535,827 B1 * | 3/2003 | Lestina et al. | 702/51 |
| 7,945,414 B2 | 5/2011 | Nagase | |
| 2009/0326719 A1 | 12/2009 | Nagase et al. | |

FOREIGN PATENT DOCUMENTS

| | | |
|---|---|---|
| JP | 8-338546 | 12/1996 |
| JP | 11-202945 | 7/1999 |

(Continued)

OTHER PUBLICATIONS

International Search Report issued in corresponding application No. PCT/JP2007/000630, completed Jul. 31, 2007 and mailed Aug. 7, 2007.

*Primary Examiner* — Carlos Ortiz Rodriguez
(74) *Attorney, Agent, or Firm* — Griffin & Szipl, P.C.

(57) ABSTRACT

With a pressure type flow control apparatus, a valve on the downstream side of a throttle mechanism is released and a flow rate setting value Qe inputted to the pressure type flow control apparatus is changed to detect the magnitude ΔV of change of a flow rate output signal Qo from the pressure type flow control apparatus while the flow rate setting value Qe is changed, so that normal functioning of the releasing operations of the valve on the downstream side of the throttle mechanism is confirmed when the magnitude ΔV of change of the flow rate output signal Qo is above the predetermined value. If the releasing operations are malfunctioning, the magnitude ΔV of changes is found to be below the predetermined value.

12 Claims, 10 Drawing Sheets

(56) References Cited

FOREIGN PATENT DOCUMENTS

| | | |
|---|---|---|
| JP | 2000-66732 | 3/2000 |
| JP | 2000-137528 | 5/2000 |
| JP | 2005-253996 | 9/2005 |
| JP | 2005-261748 | 9/2005 |
| JP | 2007-95042 | 4/2007 |
| WO | 2007/026902 A1 | 3/2007 |

* cited by examiner

PRIOR ART

PRIOR ART

METHOD FOR DETECTING MALFUNCTION OF VALVE ON THE DOWNSTREAM SIDE OF THROTTLE MECHANISM OF PRESSURE TYPE FLOW CONTROL APPARATUS

This is a National Phase Application in the United States of Application No. PCT/JP2007/000630 filed Jun. 13, 2007, which claims priority on Japanese Patent Application No. 2006-183061, filed Jul. 3, 2006. The entire disclosures of the above patent applications are hereby incorporated by reference.

FIELD OF THE INVENTION

The present invention relates to a method for detecting the malfunction of a valve installed on the downstream side of a throttle mechanism in a pressure type flow control apparatus by monitoring a flow output signal, and it is mainly directed at the use for fluid supply facilities with a pressure type flow control apparatus to be used with semiconductor manufacturing, food processing, chemical products-related facilities, and the like.

BACKGROUND OF THE INVENTION

In recent years, pressure type flow control apparatus have been increasingly used in gas supply facilities in semiconductor manufacturing, chemical products-related facilities, and the like, replacing thermal type flow control apparatus. The simple structure of a pressure type flow control apparatus makes it possible to reduce production costs and downsize the facilities. Furthermore, a pressure type flow control apparatus rivals, or exceeds, a thermal type flow control apparatus both in accuracy and responsiveness.

In these gas supply facilities, it is a common practice to regularly inspect devices and valves to see the operational conditions. Inspection activities on gas supply facilities thus is indispensable for the stable supply of a gas from gas supply facilities.

Figure 9:
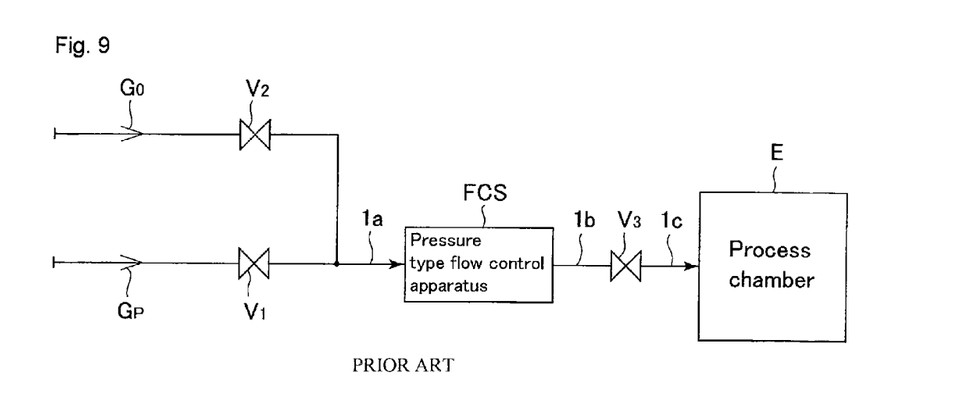
FIG. 9 shows one example of a gas supply facility for which a conventional pressure type flow control apparatus is used.

In response to such a demand as described above, applicants of the present invention have developed a method for detecting the malfunction of a valve while gas is supplied using a pressure type flow control apparatus as shown in FIG. 9, and disclosed the method in Japanese Patent Application No. 2005-253996. In particular, techniques in the aforementioned Japanese Patent Application No. 2005-253996 have made it possible to check operational conditions of valves $V_1$, $V_2$, $V_3$, and to check for the existence of sheet leaks (hereinafter called a "check"), within a gas supply facility. As shown in FIG. 9, the valves $V_1$, $V_2$, $V_3$ are checked without removal from pipe passages, thus achieving excellent practical effects. In accordance with FIG. 9, Go designates a purge gas, Gp designates a process gas, FCS (flow control system) designates a pressure type flow control apparatus, $1a$, $1b$, $1c$ designate pipe passages, and E designates a process chamber.

Figure 10:
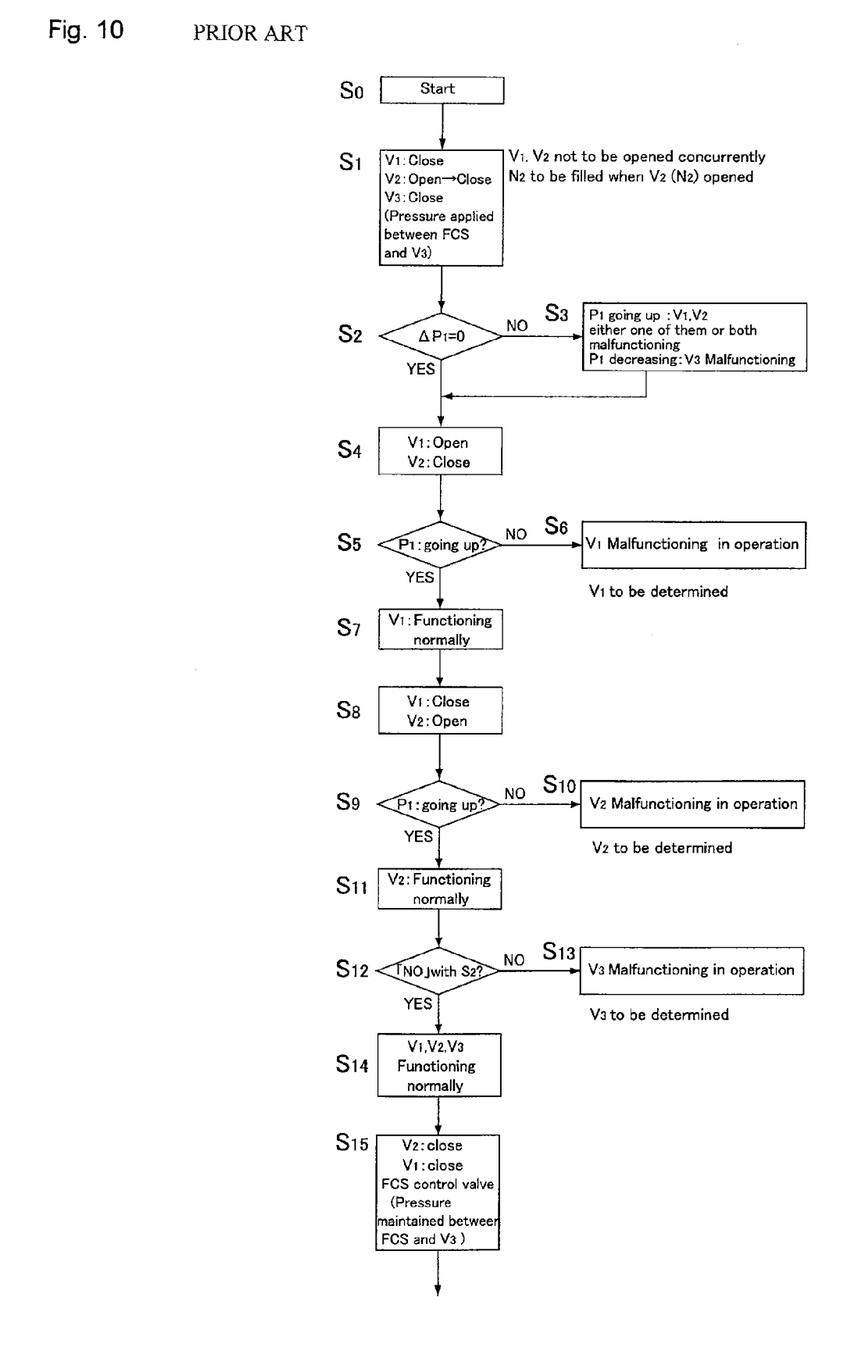
FIG. 10 is a flow chart of a method for detecting the malfunction of a valve with a gas supply facility using a pressure type flow control apparatus incorporating the previous invention.

In accordance with the gas supply facility shown in FIG. 9, in order to determine whether valves $V_1$, $V_2$, $V_3$ are operating normally or not (i.e., being open or closed), checks are conducted by following the steps shown in FIG. 10.

First, the malfunction check starts with Step So. Then, at Step $S_1$, valve $V_1$ is closed, valve $V_2$ is switched from "open" to "closed", and valve $V_3$ is closed. After these operations, a pipe passage $1b$ on the downstream side of the FCS is filled with $N_2$. Next, at Step $S_2$, the displayed pressure $P_1$ of the FCS is checked to see if the increase/decrease $\Delta P_1$ of the pressure $P_1$ is zero or not. In the case that $\Delta P_1$ is not zero and $P_1$ goes up, it is determined that there is an abnormal condition with either valve $V_1$ or valve $V_2$, or both valves $V_1$ and $V_2$ (i.e., either sheet leaks or operational irregularity is present). And, in the case that $P_1$ goes down, it is determined that $V_3$ is abnormal (i.e., sheet leaks or operational irregularity are present) (Step $S_3$).

Next, at Step $S_4$, a process gas (i.e., a use gas) Gp is flowed into the FCS by making valve $V_1$ open and valve $V_2$ close, and the displayed pressure $P_1$ of the FCS is checked at Step $S_5$. In the case when a rise of $P_1$ is observed, it is determined that $V_1$ is functioning normally (Step $S_7$); on the other hand, in the case that there is no rise of $P_1$, it is determined that valve $V_1$ is malfunctioning (Step $S_6$), thus the operational conditions of $V_1$ are confirmed. Then, after $V_1$ is closed and $V_2$ is opened at Step $S_8$, the displayed pressure $P_1$ of the FCS is checked (Step $S_9$). In the case when there is no rise of $P_1$, it is determined that valve $V_2$ is malfunctioning (Step $S_{10}$), thus the operational conditions of valve $V_2$ are confirmed. On the other hand, when a rise of $P_1$ is observed, it is determined that valve $V_2$ is functioning normally (Step $S_{11}$).

Then, at Step $S_{12}$, it is determined whether or not the malfunction of valves found at the Step $S_2$ is applicable to the operational malfunction of a valve $V_3$. Specifically, if the result of Step $S_2$ is "NO" (that is, one of valves $V_1$, $V_2$, $V_3$ is malfunctioning), and valves $V_1$ and $V_2$ are functioning normally, it is determined that a valve $V_3$ is malfunctioning (Step $S_{13}$). If the result of Step $S_2$ is "YES", then, it is determined that all the valves $V_1$, $V_2$, $V_3$ are functioning normally (Step $S_{14}$).

After it is determined that the aforementioned valves $V_1$, $V_2$, $V_3$ are all operating normally, sheet leaks are then checked at Step $S_{15}$. To determine whether the operational conditions of the valves are normal or not, there exist prerequisites that (a) there should be no outside leaks (i.e., leaks from joints, bonnets, and the like) with valves $V_1$, $V_2$, $V_3$, FCS, pipe passages $1a$, $1b$, $1c$, and the like, except sheet leaks,
(b) driving parts of all valves are under normal operation,
(c) the FCS is functioning normally, and
(d) $V_1$ and $V_2$ are not simultaneously released.

Figure 11:
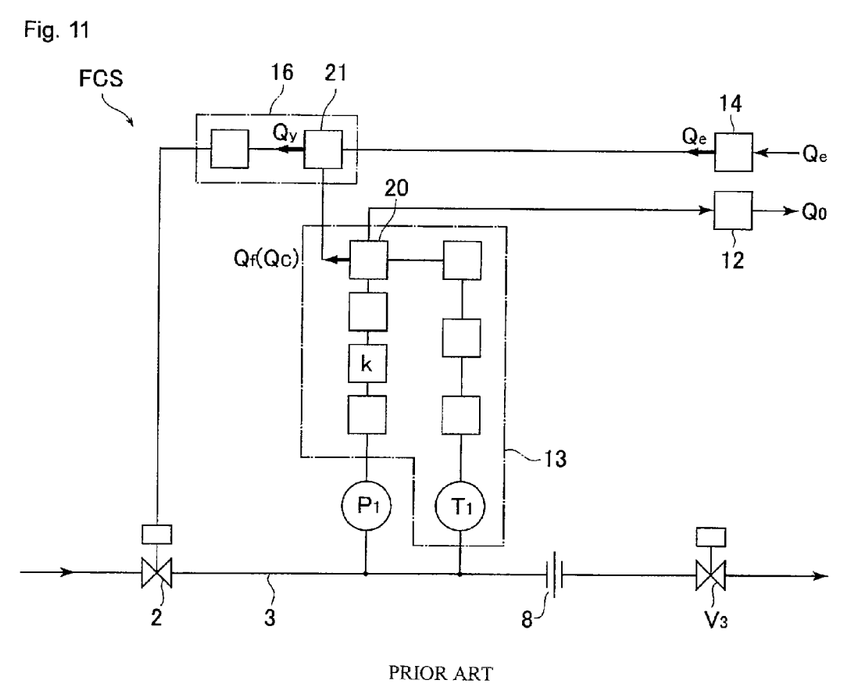
FIG. 11 is a basic block diagram of a conventional pressure type flow control apparatus.

However, as shown in FIG. 11, the system is constituted so that, with a pressure type flow control apparatus FCS, a flow rate of a gas passing through a throttle mechanism is computed on the basis of the gas pressure P1 and gas temperature T1 on the upstream side of a throttle mechanism 8 such as an orifice, a sonic nozzle, or the like, (Japanese Unexamined Patent Application Publication No. 8-338546 and others). Therefore, for example, even when valve V3 on the downstream side of the throttle mechanism is closed, and the flow rate of a gas passing through throttle mechanism 8 is found to be zero, a gas flow rate Qf is computed by flow rate computation apparatus 20 of flow rate computation circuit 13 if gas pressure P1 is applied to pipe passage 3, thus what is computed is outputted as a flow rate output signal Qo. Specifically, even when there occurs no gas flow due to the malfunction of releasing valve V3, a flow rate output signal Go is outputted to the outside. In FIG. 11, 2 designates a control valve, 12 designates a flow rate output circuit, 14 designates a flow rate setting circuit, 16 designates a computation control circuit, 21 designates a comparison circuit, and Qy designates a control signal (Qy=Qe−Qf).

When opening/closing operations of the valve $V_3$ on the downstream side of the FCS are conducted while the gas supply facility is at work, there is no way to find out directly if a malfunction of the releasing operations of the valve $V_3$ exists or not.

The reason for this is, as described above, that even when a flow rate of gas passing through throttle mechanism 8 is found to be zero (valve $V_3$ is in the state of closure), a flow rate output signal Qo is outputted to the outside if there exists pressure $P_1$ on the upstream side of throttle mechanism 8. In other words, it is assumed that valve $V_3$ is kept open all the time from the viewpoint of a flow rate output signal Qo even when valve $V_3$ actually remains closed due to malfunction of valve $V_3$.

Patent Document 1: Japanese Unexamined Patent Application Publication No. 8-338546

Patent Document 2: Japanese Unexamined Patent Application Publication No. 2000-66732

Disclosure of the Invention

SUMMARY OF THE INVENTION

Object of the Invention

It is an object of the present invention to provide a method for detecting the malfunction of a valve downstream of a throttle mechanism of a pressure type flow control apparatus with which the aforementioned problem of detecting the malfunction of the valve on the downstream side of the throttle mechanism of the pressure type flow control apparatus occurs; that is, the problem that accurate determination of the malfunction at the time of releasing operations of the valve on the downstream side of the throttle mechanism cannot be performed by using the pressure $P_1$ on the upstream side of the throttle mechanism of the pressure type flow control apparatus (or a flow rate output signal Qo) due to the structure of a pressure type flow control apparatus so that a flow rate output signal Qo is outputted externally due to the pressure $P_1$ on the upstream side of the throttle mechanism when there exists no flow of a gas passing through the throttle mechanism. This problem can be overcome, thus achieving a prompt, accurate determination of malfunction of the opening operation of the valve on the downstream side of the throttle mechanism on the basis of changes of the flow rate output signal Qo from the pressure type flow control apparatus when the valve on the downstream side of the throttle mechanism is undergoing opening/closing operations without the pressure type flow control apparatus having to be converted to a malfunction detection mode by the gas supply facility.

Means to Achieve the Object

One embodiment of the present invention is used in a gas supply facility wherein the pressure type flow control apparatus is so made that the fluid pressure $P_1$ is adjusted to make the flow rate control signal Qy to be zero by computing the flow rate Qf of fluid passing through the throttle mechanism by using the fluid pressure $P_1$ on the upstream side of the throttle mechanism, and a control valve 2 on the upstream side of the throttle mechanism is operated to open or close by making a difference between the flow rate computation value Qf of the fluid and a flow rate setting value Qe to be a flow rate control signal Qy. Thus, the flow rate computation value Qf of the fluid is outputted as a flow rate output signal Qo. A valve on the downstream side of a throttle mechanism of the pressure type flow control apparatus is released and a flow rate setting value Qe to be inputted to a pressure type flow control apparatus is changed in order to detect the magnitude of changes ΔV of the aforementioned flow rate output signal Qo while the flow rate setting signal Qe changes. This determines whether the releasing operations of the valve on the downstream side of the throttle mechanism are functioning normally in the case that the magnitude ΔV of changes of the flow rate output signal Qo is found to be above the predetermined value. On the other hand, the releasing operations are malfunctioning in the case wherein the magnitude ΔV of changes is found to be below the predetermined value.

Another embodiment of the present invention is so made that, when changing a flow rate setting value Qe to be inputted to a pressure type flow control apparatus, a flow rate setting value Qe' larger than a steady-state flow rate setting value Qe" or a flow rate setting value Qe' smaller than a steady-state flow rate setting value Qe" is inputted as a flow rate setting value Qe.

A different embodiment of the present invention used in a gas supply facility wherein a pressure type flow control apparatus is so made that fluid pressure $P_1$ is adjusted to make a flow rate control signal Qy to be zero by means that a flow rate Qf of fluid passing through a throttle mechanism is computed by using the fluid pressure $P_1$ on the upstream side of the throttle mechanism and a control valve 2 on the upstream side of the throttle mechanism is opened/closed by making the difference between the flow rate computation value Qf and flow rate setting value Qe to be a flow rate control signal Qy, thus the aforementioned flow rate computation value Qf of fluid is outputted as a flow rate output signal Qo, a valve on the downstream side of a throttle mechanism of the pressure type flow control apparatus is closed and a flow rate setting value Qe to be inputted to the pressure type flow control apparatus is set to zero, to detect the magnitude ΔV of changes of the aforementioned flow rate output signal Qo while it is changing after the flow rate setting value Qe having been set to zero. This distinguishes the situation where the releasing operations of the valve on the downstream side of the throttle mechanism are functioning normally, in which case the magnitude ΔV of changes of the flow rate output signal Qo is found to be above the predetermined value, from the situation where the releasing operations are malfunctioning, in which case the magnitude ΔV of changes is found to be below the predetermined value.

Another embodiment of the present invention is so made that the flow rate setting value Qe to be inputted to the pressure type flow control apparatus concurrently with the closure of the valve on the downstream side of the throttle mechanism or with the delay of a given time Δt is set to zero.

A different embodiment of the present invention is used in a gas supply facility for which a pressure type flow control apparatus is so made that fluid pressure $P_1$ is adjusted to make a flow rate control signal Qy to be zero by computing the flow rate Qf of fluid passing through a throttle mechanism by using the fluid pressure $P_1$ on the upstream side of the throttle mechanism, and a control valve 2 on the upstream side of the throttle mechanism is operated to open or close by making a difference between the flow rate computation value Qf of the fluid and a flow rate setting value Qe to be the flow rate control signal Qy. Thus, the flow rate computation value Qf of the fluid is outputted as a flow rate output signal Qo, a valve on the downstream side of the throttle mechanism of the pressure type flow control apparatus is released and a flow rate setting signal Qe is inputted to the pressure type flow control apparatus, in order to detect the magnitude ΔV of changes of the flow rate output signal Qo after the valve on the downstream side of the throttle mechanism has been released. The releasing operations of the valve on the downstream side of the throttle mechanism are determined to be functioning normally in the case that the magnitude ΔV of changes of the flow rate output signal Qo is found to be above the predetermined value; on the other hand, the releasing operations are determined to be malfunctioning in the case that the magnitude ΔV of changes is found to be below the predetermined value.

Another embodiment of the present invention is so made that the magnitude of the drop rate of the flow rate output signal Qo is detected by means that the flow rate setting signal Qe is inputted to the pressure type flow control apparatus with a delay of the predetermined time Δt after the command to release the valve on the downstream side of the throttle mechanism has been transmitted.

Embodiments of the present invention may be made such that an orifice or a sonic nozzle is used for the throttle mechanism.

Effects of the Invention

The present invention is so constituted that changes are made by means that a flow rate setting value Qe of a pressure type flow control apparatus is switched to "ON" or "OFF" either concurrently with opening or closing operations of a valve on the downstream side of a throttle mechanism of a pressure type flow control apparatus, or with a delay of a given time Δt after opening/closing operations of the valve on the downstream side having been made, thus determining whether the valve on the downstream side of the throttle mechanism is functioning normally or not by observing the changes of a flow rate output signal Qo between opening or closing operations of the valve on the downstream side of the throttle mechanism and also between "ON" or "OFF" of the flow rate setting value Qe. As a result, it can be determined whether opening operations of the valve on the downstream side of the throttle mechanism of the pressure type flow control mechanism are functioning normally or not, easily and simply, while a gas supply facility is at work. This is accomplished without installing or adding an extra testing device and without the pressure type flow control apparatus having to be switched to a malfunction detecting mode for the gas supply facility, but simply by monitoring a flow rate output signal Qo of the pressure type flow control apparatus. Thus, the problem that "the existence of a flow rate output signal Qo of a pressure type flow control apparatus does not lead directly to the opening operations of a valve on the downstream side of a throttle mechanism" is easily overcome.

BRIEF DESCRIPTION OF THE DRAWINGS

FIG. 8 shows the state of changes of the flow rate output signal Qo of the FCS in Embodiment 3 where
(a) flow rate setting input Qe is set to 100% (5V),
(b) flow rate setting input Qe is set to 50%, and
(c) flow rate setting input Qe is set to 5%
(in the case of one (1) valve on the downstream side of the throttle mechanism and in the case of four (4) valves in parallel).

REFERENCE CHARACTERS AND NUMERALS

Qe A flow rate setting value (a flow rate setting signal)
Qe" A steady-state flow rate setting value
Qe' A flow rate setting value
Qc A flow rate computation value
Qf A switching flow rate computation value
Qo A flow rate output signal
Qy A flow rate control signal
$P_1$ Gas pressure on the upstream side of a throttle mechanism
K A flow rate conversion rate
$IV_2$ A current for operating a valve $V_2$
ΔV Deviation of a flow rate output signal at the time when a valve $V_2$ on the downstream side of a throttle mechanism is not released
Qo' A flow rate output at the time when a valve $V_2$ on the downstream side of a throttle mechanism is not released
Qo A flow rate output at the time when a valve $V_2$ on the downstream side of a throttle mechanism is normally functioning
EV An electro-magnetic valve
U A pressure supply line for operating a valve
Pe A vacuum pump
VR A flow rate valve
Pb Baratron vacuum pump
PG A process gas
$N_2$ A gas for operating a valve
C A chamber $V_1$, $V_2$ Air actuating valves
PLC A programmable controller
PL A data logger
S A gas supply source ($N_2$)
Qe" A steady-state flow rate
Qe' A set flow rate different from a steady-state flow rate
1 A gas supply
2 A control valve
3 A pipe passage on the upstream side of a throttle mechanism
4 A valve actuating part
5 A pipe passage on the downstream side of a throttle mechanism
6 A pressure detector
7 A temperature detector
8 A throttle mechanism
9 A gas outlet
10 An amplifier
11 An amplifier
12 A flow rate output circuit
13 A flow rate computation circuit
14 A flow rate setting circuit
15 A flow rate conversion circuit
16 A computation control circuit
17 An A/D converter
18 An A/D converter
19 A temperature compensation circuit
20 A computation circuit
21 A comparison circuit
22 An amplifier

DETAILED DESCRIPTION OF THE ILLUSTRATIVE EMBODIMENTS

Best Mode for Carrying Out the Invention

Figure 1:
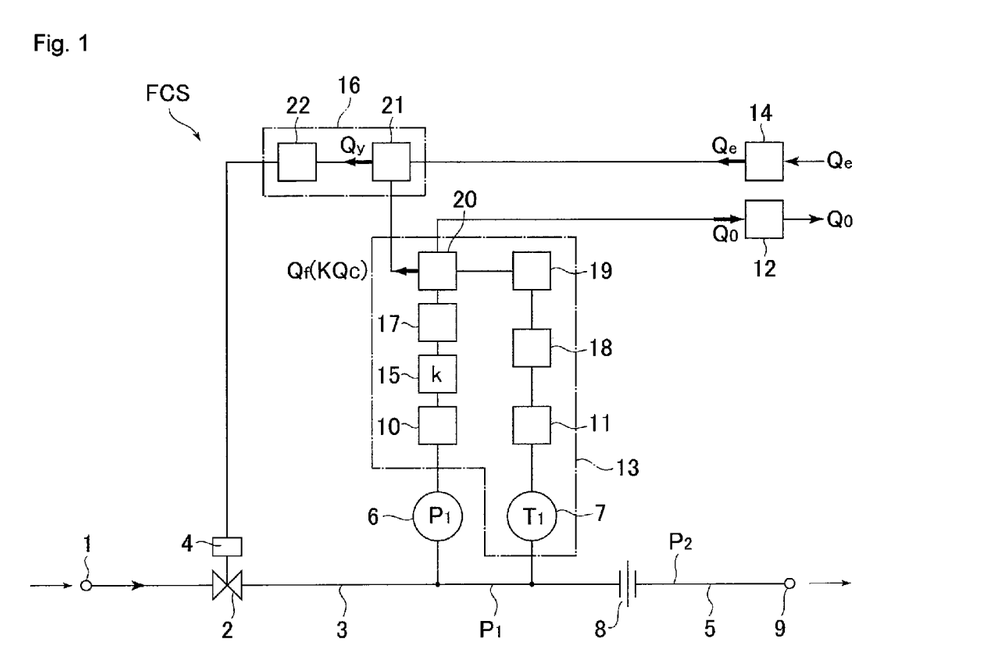
FIG. 1 shows one example of a pressure type flow control apparatus FCS used with the present invention.
Figure 2:
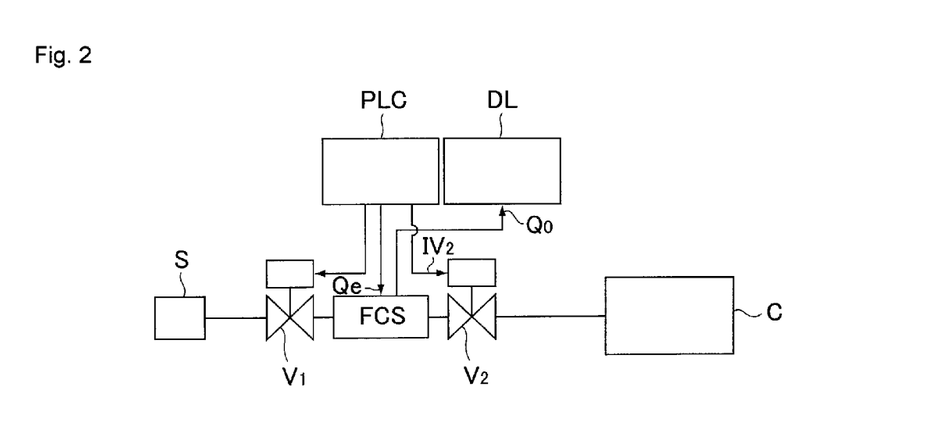
FIG. 2 is an execution explanatory drawing of a method for detecting malfunction of a valve downstream of a throttle mechanism with the pressure type flow control apparatus in accordance with Embodiment 1 of the present invention.

Preferred embodiments in accordance with the present invention are explained hereinafter in reference to drawings. FIG. 1 shows the components of a pressure type flow control apparatus used with the present invention. FIG. 2 is an illustration of a method for detecting malfunction of a valve on the downstream side of a throttle mechanism in accordance with Embodiment 1 of the present invention.

Referring now to FIG. 1, the major part of a pressure type flow rate control apparatus FCS comprises a gas supply 1, a control valve 2, a valve actuating part 4, a pressure detector 6, a throttle mechanism 8, a gas outlet 9, a flow rate output circuit 12, a flow rate computation circuit 13, a flow rate setting circuit 14, a computation control circuit 16 and others. In accordance with FIG. 1, 3 designates a pipe passage on the upstream side of a throttle mechanism, 5 designates a pipe passage on the downstream side of a throttle mechanism, 7 designates a temperature detector, 15 designates a flow rate conversion circuit, 10, 11, and 22 designate amplifiers, 17 and 18 designate A/D converters, 19 designates a temperature compensation circuit, 20 designates a flow rate computation device, 21 designates a comparison circuit, Qc designates a computation flow rate signal, Qf designates a switching computation flow rate signal, Qe designates a flow rate setting signal, Qo designates a flow rate output signal, Qy designates a flow rate control signal, $P_1$ designates gas pressure on the upstream side of a throttle mechanism, and k designates a flow rate conversion rate. With preferred embodiments shown in FIG. 1, FIG. 2 and others, an orifice has been used for throttle mechanism 8. However, it goes without saying that the orifice can be replaced by a sonic nozzle or a diaphragm valve.

The aforementioned pressure type flow control apparatus FCS shown in FIG. 1 is mainly used in the case wherein the ratio $P_2/P_1$ of the gas pressure $P_1$ on the upstream side of the throttle mechanism and the gas pressure $P_2$ on the downstream side of the throttle mechanism is equal to or lower than the critical value of a fluid (that is, where the gas flow is in the critical state). A flow rate Qc of gas passing through the throttle mechanism 8 is given by Equation $Qc=KP_1$ (where K is a proportionality constant). A pressure type flow control apparatus is used to control the flow rate of a gas, which can exhibit both critical and non-critical states of flow. With some other types, the flow rate Qc of gas passing through throttle mechanism 8 is given by Equation $Qc=KP_2^m(P_1-P_2)^n$ (where K is a proportionality constant, m and n constants, and $P_2$ the gas pressure on the downstream side of a throttle mechanism). However, the fundamental constitutions of these other flow control systems are the same as that of the pressure type flow control apparatus FCS shown in FIG. 1. Therefore, explanations are omitted herewith.

In the pressure type flow control apparatus FCS, the setting value of the control flow rate is given by a voltage value as the flow rate setting signal Qe. For example, when the pressure control range 0~3 (kgf/cm² abs) of the pressure $P_1$ on the upstream side is expressed by the voltage range 0~5V, it means that Qe=5V (a full scale value) is the flow rate Qc under the pressure $P_1$ of 3 (kgf/cm² abs). More specifically, when the conversion rate k of a flow rate conversion circuit 15 is set at 1 and the flow rate setting signal Qe=5V is inputted, a switching computation flow rate signal Qf (Qf=kQc) becomes 5V, thus the control valve 2 is operated for opening/closing until the pressure $P_1$ on the upstream side gets to 3 (kgf/cm²abs). This means that gas of a flow rate $Qc=KP_1$, corresponding to $P_1=3$ (kgf/cm²abs), flows through throttle mechanism 8.

Embodiment 1

FIG. 2 is an explanatory drawing of a test unit used for executing a method for detecting the malfunction of a valve on the downstream side of a throttle mechanism in accordance with Embodiment 1 of the present invention. Namely, as shown in FIG. 2, the test unit is so constituted that a gas supply valve $V_1$ and a valve $V_2$ on the downstream side of the throttle mechanism are connected to the upstream side and downstream side of a pressure type flow control apparatus FCS respectively, thereon a programmable controller PLC and a data logger DL are set, and following the prescribed program from the programmable controller PLC, a flow rate setting signal Qe is supplied to valves $V_1$, $V_2$ and a flow rate setting circuit 14 of a pressure type flow control apparatus FCS, and a valve releasing signal $IV_2$ to a valve $V_2$, a flow rate setting signal Qe to the FCS and a flow rate output signal Qo from the FCS are recorded on the data logger respectively. With FIG. 2, S designates a gas source and C designates a chamber.

Figure 3:
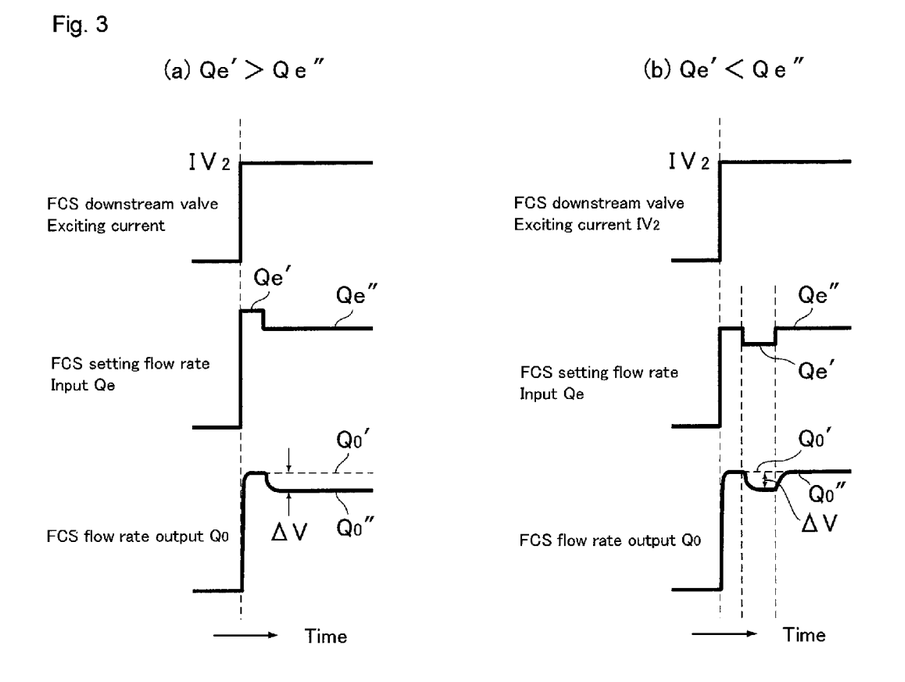
FIG. 3 shows the relationship of timing of a flow rate setting input signal Qe to the pressure type flow control apparatus FCS, a valve releasing current $IV_2$ to a valve $V_2$ on the downstream side of the throttle mechanism and a flow rate output signal Qo from the FCS with Embodiment 1, where
(a) shows the case when the flow rate setting signal Qe" at the time of testing is made to be larger than a steady-state flow rate setting signal Qe" and
(b) shows the case when the flow rate setting signal Qe' at the time of testing is made to be smaller than the steady-state flow rate setting signal Qe".

Specifically, such a test system as shown in FIG. 2 has been formed in order to detect the malfunction of valve $V_2$ on the downstream side of the throttle mechanism of the pressure type flow control apparatus FCS (operations from closure to opening not being able to be performed), and as shown in FIG. 3, first a flow rate value Qe which differs from a steady-state flow rate value Qe" is sent as a flow rate setting signal Qe to the FCS, and then the flow rate setting signal Qe equal to the steady-state flow rate value Qe" is inputted. FIG. 3(a) shows the case wherein the flow rate setting value Qe', which differs from the steady-state flow rate value Qe", is made to be larger than a steady-state flow rate value Qe", and FIG. 3(b) shows the case wherein the flow rate setting value Qe', which differs from a steady-state flow rate value Qe", is set smaller than the steady-state flow rate value Qe".

As shown in FIG. 3, when the flow rate setting signal Qe is inputted to the FCS and a releasing operation current $IV_2$ (an exciting current) is supplied concurrently to the valve $V_2$ on the downstream side of the throttle mechanism, the flow rate output Qo from the pressure type flow control apparatus FCS shows changes as illustrated in the lowermost parts of FIGS. 3(a) and (b). Specifically, a deviation ΔV in a flow rate output occurs between a flow rate output Qo' in the case that the valve $V_2$ on the downstream side of the throttle mechanism is not released and a flow rate output Qo" in the case that the valve $V_2$ is released normally, thus making it possible to determine whether the valve $V_2$ on the downstream side of the throttle mechanism has been normally released or not, by monitoring the flow rate output signal Qo from the pressure type flow control apparatus FCS.

Specifically, at the preparatory stage for finishing a process treatment operation or starting a process treatment operation for which a chamber C is used, the flow rate setting signal Qe and the valve releasing current $IV_2$ are supplied to a pressure type flow control apparatus FCS and to a valve $V_2$ on the downstream side of a throttle mechanism, respectively, through the mediation of the programmable controller PLC, and then the state of changes of the flow rate output signal Qo from the FCS is observed, thus determining whether valve $V_2$ on the downstream side of the throttle mechanism has been released normally, if the deviation ΔV is found to be above the set value, or whether valve $V_2$ has not been released normally, if the deviation ΔV is found to be below the prescribed value.

Embodiment 2

Figure 4:
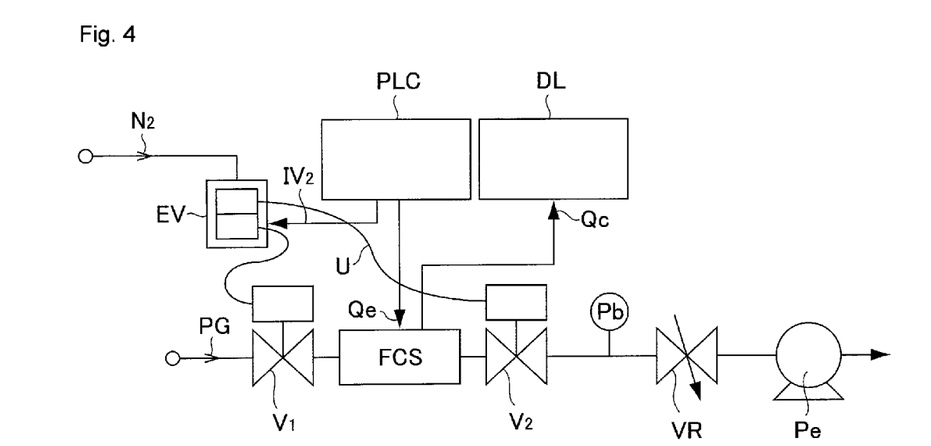
FIG. 4 is an execution explanatory drawing of a method for detecting the malfunction of the valve on the downstream side of the throttle mechanism with the pressure type flow control apparatus, in accordance with Embodiment 1 of the present invention.

Embodiment 2 is made so that an operational malfunction of a valve $V_2$ on the downstream side of a throttle mechanism is detected at the time of the completion of a process treatment. FIG. 4 is an explanatory drawing of a test system used with Embodiment 2. In FIG. 4, EV designates an operational electro-magnetic valve, $V_1$ designates a valve on the FCS upstream side, Pe designates a vacuum pump, Pb designates a Baratron vacuum pump, VR designates a flow rate valve, $N_2$ designates an operational gas, and PG designates a process gas.

The detection of the operational malfunction of the valve $V_2$ on the downstream side of the throttle mechanism has been performed in a manner such that changes of a FCS flow rate output signal Qo are monitored after a flow rate setting signal Qe to the FCS is set to zero (the FCS shutdown) at the time when a treatment process is terminated, for two distinct cases. In one case, as shown in FIG. 5(a), the shutdown of a flow rate setting signal Qe of the pressure type flow control apparatus FCS and the closure of the valve $V_2$ on the downstream side of the throttle mechanism are conducted concurrently (hereinafter called a normal step), and in the other case, as shown in FIG. 5(b), some delay of time Δt is made between the closure of the valve $V_2$ on the downstream side of the throttle mechanism and the shutdown of a flow rate setting signal of the FCS (hereinafter called a multi-step).

Figure 5:
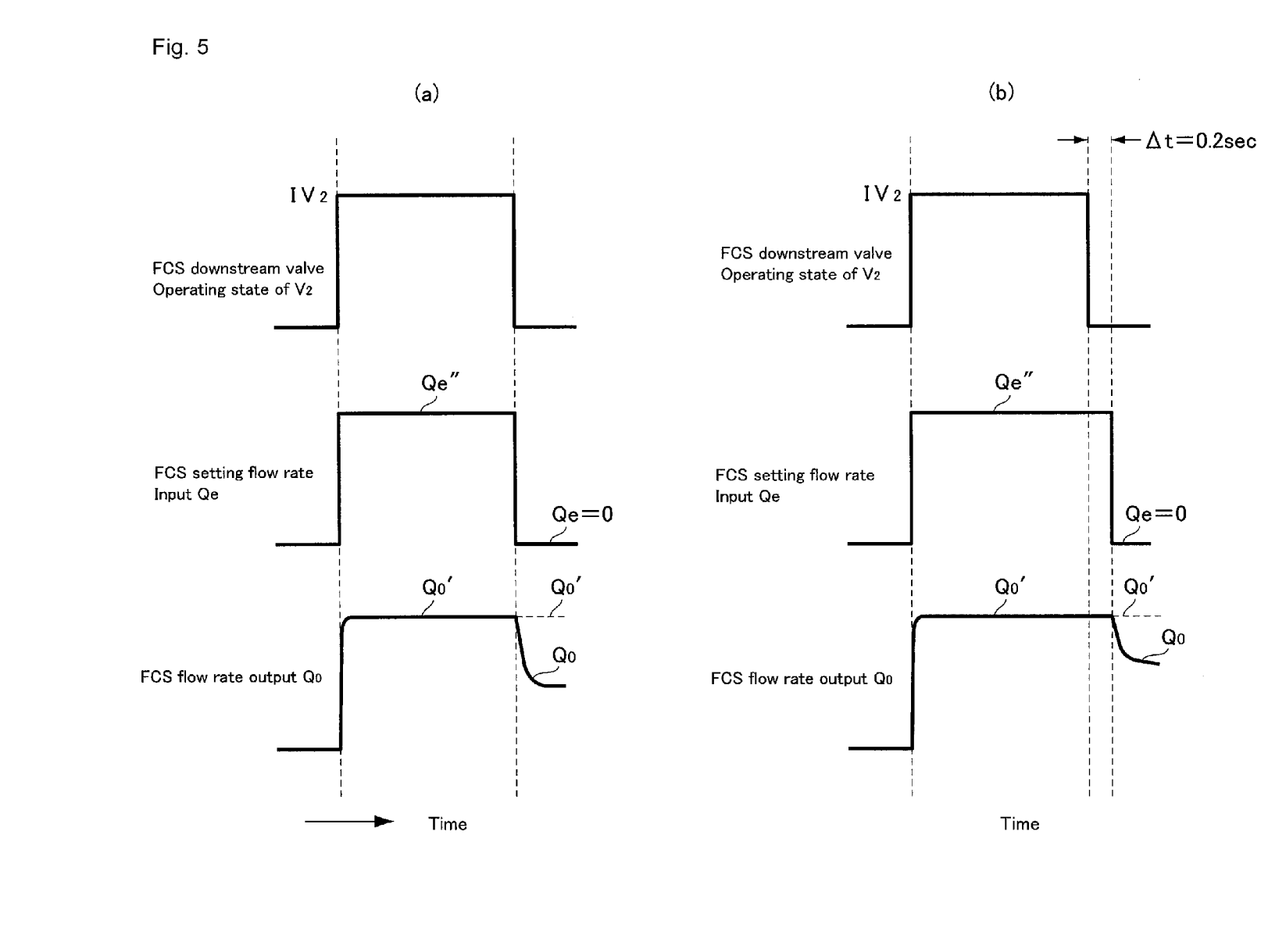
FIG. 5 shows the relationship of timing of the flow rate setting input signal Qe to the FCS, the electro-magnetic current $IV_2$ to an electro-magnetic valve EV which actuates valve $V_2$ downstream of the throttle mechanism, and the flow rate output signal Qo from the FCS with Embodiment 2, where
(a) shows the case when the closure of the valve $V_2$ on the downstream side of the throttle mechanism and the closure of the FCS are conducted nearly at the same time, and
(b) shows the case when the flow rate setting input Qe to the FCS is made to be zero (the closure of the FCS) with a delay of time Δt=0.2 sec after the closure of the valve on the downstream side of the throttle mechanism respectively.

As shown in FIGS. 5(a) and (b), it is assumed that there exists a malfunction in releasing of the valve $V_2$ on the downstream side of the throttle mechanism in the case that the flow rate output signal Qo shows no drop after the closure of the valve V2 on the downstream side of a throttle mechanism and the closure of the FCS (the closure of the control valve 2 of the FCS) and the same state of flow rate output signal Qo' is maintained. The reason for this assumption is that the fact that there is seen a flow rate output Qo' without the flow rate output Qo not becoming zero means there remains a gas pressure between throttle mechanism 8 and the valve $V_2$ on the downstream side of the throttle mechanism, and there is seen no decrease in the remaining pressure (that is, a valve $V_2$ not releasing the pressure).

With regard to actually determining the malfunction of a valve, it is required that first the internal capacity of a pressure supply line U for operating a valve between an electro-magnetic valve EV and the valve $V_2$ on the downstream side of the throttle mechanism, and also the delay time between the input of a current signal for closing the valve $V_2$ on the downstream side of the throttle mechanism and an actual closing operation of valve V and others are taken into consideration, and then a threshold value of the drop rate of a flow rate output signal Qo of the FCS is established; thus it is determined that there exists a malfunction with the releasing operation of a valve $V_2$ on the downstream side of the throttle mechanism in the case that the drop rate of the flow rate output signal Qo is below the prescribed drop rate.

Figure 6:
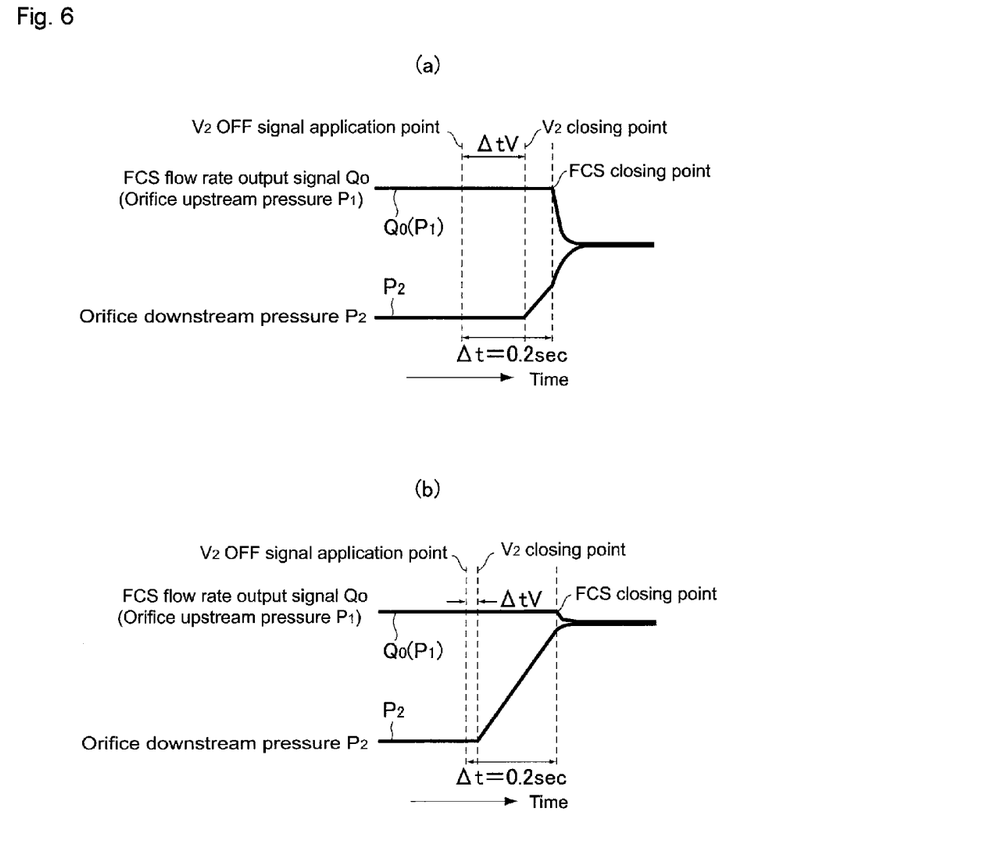
FIG. 6 is an explanatory drawing to show the relationship of a drop rate of a flow rate output signal Qo of the FCS by means of the multi-step method shown in FIG. 5(b) and a time ΔtV with a delay in the operation of the valve $V_2$ on the downstream side of a throttle mechanism.

FIG. 6 shows the relationship of the difference ΔtV between the closing operation signal input for the valve $V_2$ on the downstream side of the throttle mechanism and an actual operating time and also the flow rate output Qo of the FCS (the pressure $P_1$ on the upstream side of a throttle mechanism) and the pressure $P_2$ on the downstream side of a throttle mechanism. As apparent from FIGS. 6(a) and (b), if the aforementioned ΔtV is small (FIG. 6(b)), the amount of change of a flow rate output Qo of the FCS (the pressure $P_1$ n the upstream side of a throttle mechanism) becomes small, thus making it difficult to determine whether a valve $V_2$ is malfunctioning by monitoring the drop rate of the flow rate output signal Qo.

It goes without saying that the magnitude of ΔtV depends upon the properties of valve $V_2$, electro-magnetic valve EV, the internal capacity of a pressure supply line U for operating a valve, and the like, and further that changes of the pressure $P_2$ on the downstream side of the throttle mechanism varies largely according to the conditions, such as the flow rate range in use of a pressure type flow control apparatus, the pressure on the camber side, and the like.

Embodiment 3

With Embodiment 3, the malfunction of a valve $V_2$ on the downstream side of a throttle mechanism (releasing not functioning) is detected by monitoring a FCS flow rate output signal at the time of a startup of a pressure type flow control apparatus FCS. This is mainly used to detect any operational malfunction of valve $V_2$ on the downstream side of the throttle mechanism during the preparatory stage of starting up a process system.

A test device used with Embodiment 3 is same as that shown in FIG. 4. Specifically, with Embodiment 3, the malfunction of a releasing operation of a valve $V_2$ on the downstream side of the throttle mechanism is determined by monitoring the drop quantity of a FCS flow rate output signal Qo which occurs within a time Δt (a delay time Δt=0.2 sec) from a valve $V_1$ on the primary side of the pressure type flow control apparatus FCS, and valve $V_2$ on the downstream side of the throttle mechanism is released until a flow rate setting signal Qe being inputted to the FCS and by making the drop quantity as a basis.

Figure 7:
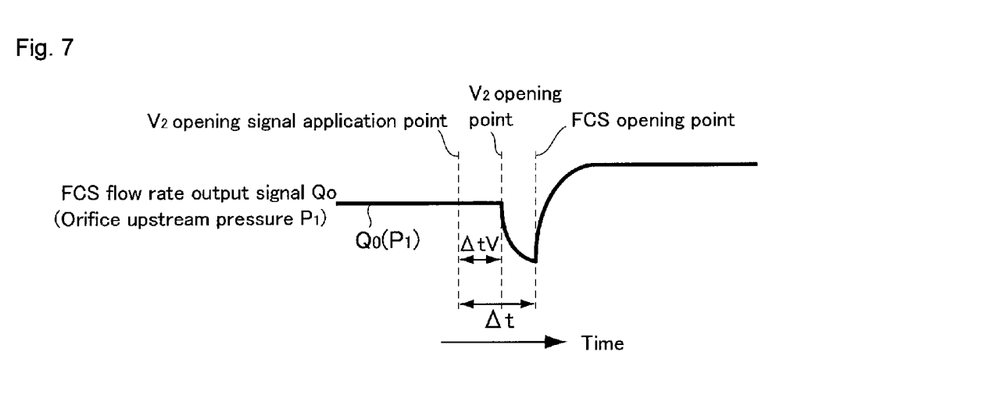
FIG. 7 is an explanatory drawing similar to FIG. 6 with Embodiment 3 (the case when the malfunction is determined from the rate of changes of a flow rate output signal Qo of the FCS at the time of start-up of a pressure type flow control apparatus FCS by means of the multi-step method).

FIG. 7 shows the relationship of the FCS flow rate output signal Qo, a delay time Δt=0.2 sec, a delay time ΔtV in releasing valve $V_2$ on the downstream side of the throttle mechanism, and the like, with Embodiment 3. At the preparatory stage of starting up the process, when valve $V_1$ on the upstream side of the FCS and valve $V_2$ on the downstream side of the throttle mechanism are made open, and the FCS is operated with a delay time Δt=0.2 sec (a flow rate setting signal Qe in), the FCS flow rate output signal Qo drops during the delay time Δt in the case that valve $V_2$ on the downstream side of a throttle mechanism is functioning normally for a releasing operation, and conversely there would be no changes in the FCS flow rate output signal Qo during a delay time Δt when valve $V_2$ on the downstream side of the throttle mechanism is not releasing normally.

As with Embodiment 2, a degree (a drop rate) of change of the FCS flow rate output signal varies largely depending on the delay time in releasing valve $V_2$ on the downstream side of the throttle mechanism. Accordingly, it is found that the drop rate during the delay time Δt of the FCS flow rate output signal Qo is largely affected by the length of pressure supply line U for operating valve $V_2$ on the downstream side of the throttle mechanism, the type of an electro-magnetic valve EV, the flow rate setting range for the pressure type flow control apparatus FCS, and the like.

Figure 8A:
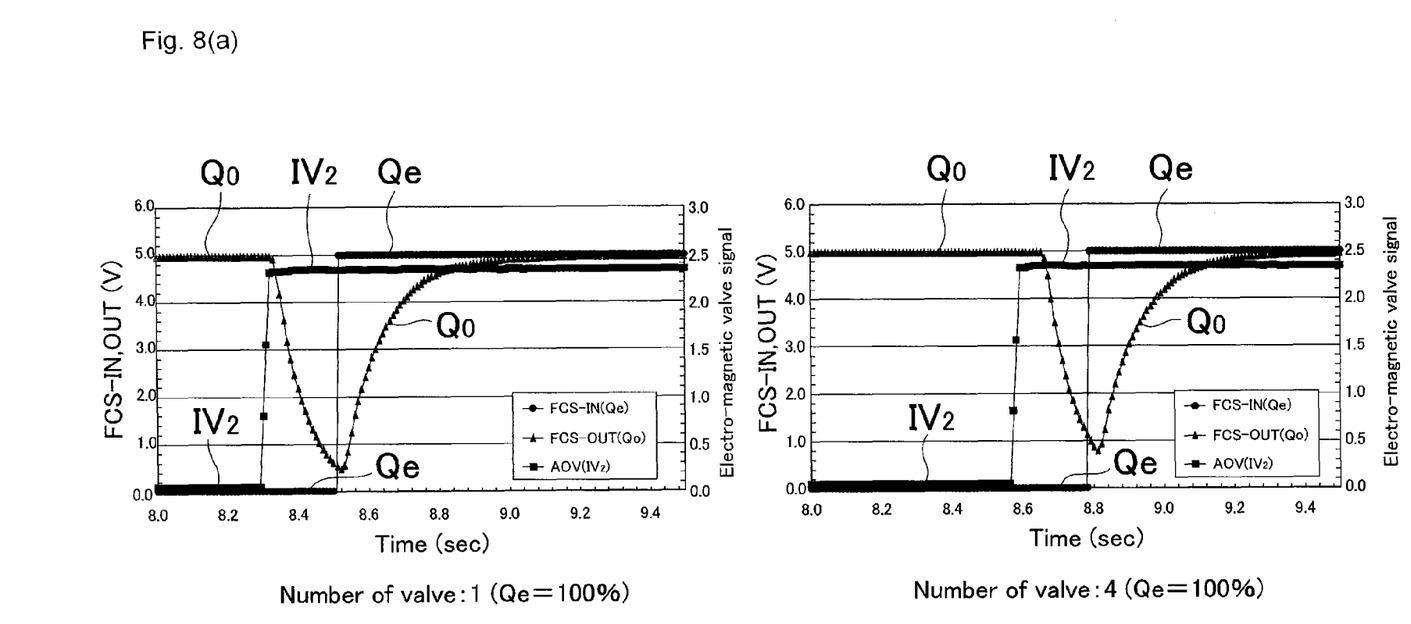
Figure 8B:
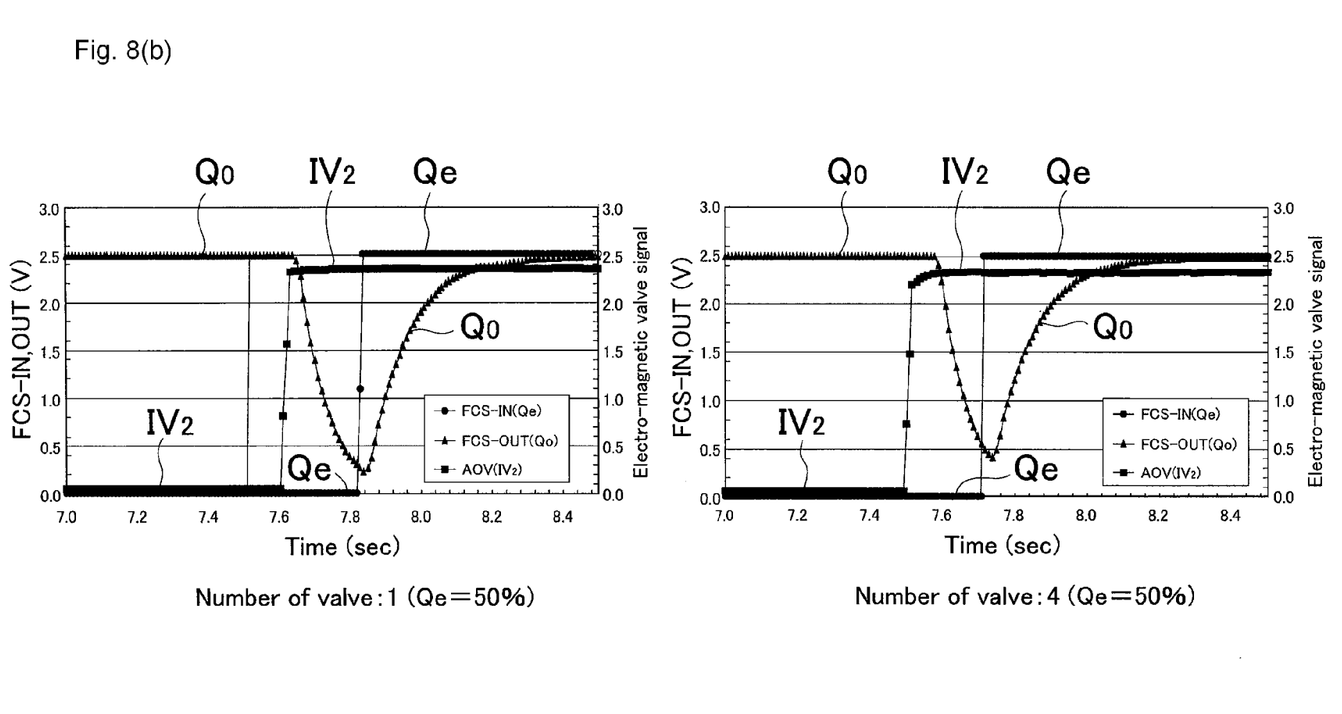
Figure 8C:
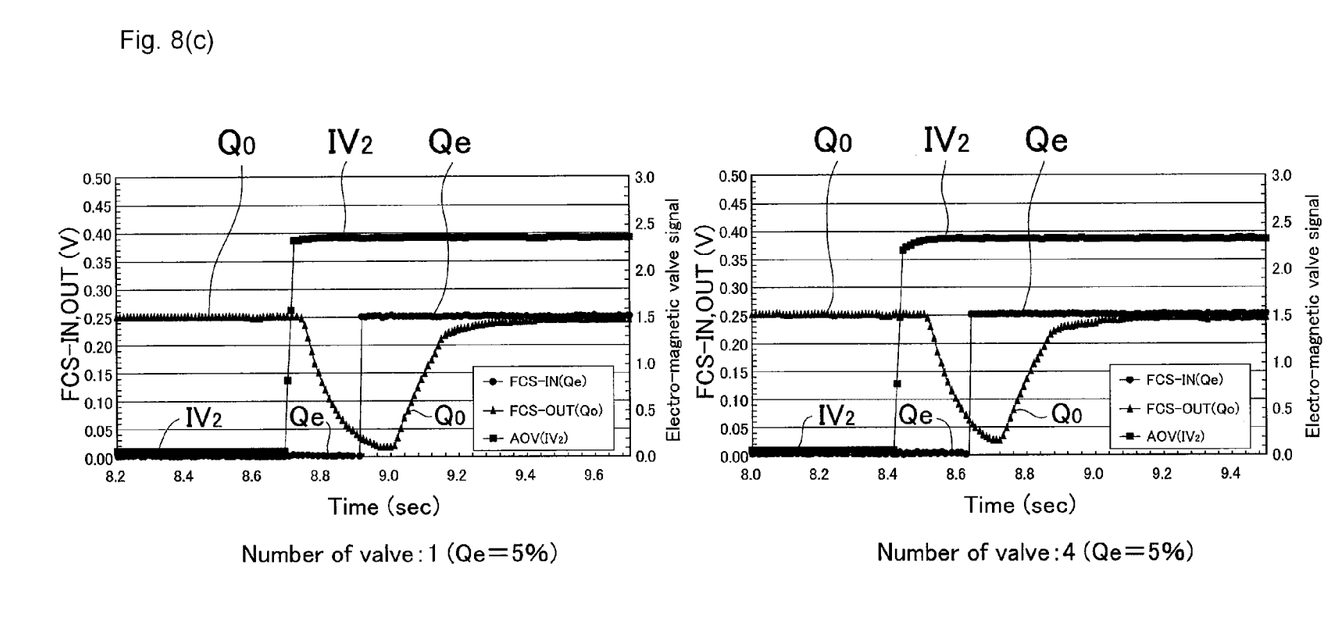

FIG. 8 shows the results of monitoring the state of the drop of the flow rate output signal Qo when a flow rate setting signal Qe of a pressure type flow control apparatus FCS and the number of valves $V_2$ on the downstream side of a throttle mechanism are changed. A standard type with a rated flow rate of 1 SLM is employed for the pressure type flow control apparatus FCS. A valve having a Cv value of 0.1 and a valve having a Cv value of 0.2 are used for valves $V_1$ and $V_2$ respectively. Furthermore, pressure supply line U for operating valves $V_1$ and $V_2$ has an internal diameter of 2.5 mmφ and the length of 1 m. A flow rate control valve VR and a vacuum pump Pe are so adjusted that pressure $P_2$ downstream of the throttle mechanism is 120 Torr when $N_2$=2 SLM is supplied.

As apparent from FIG. 8, the average pressure drop rate of the FCS flow rate output signal Qo was 89.9% (with one valve $V_2$) to 79.4% (with four (4) valves $V_2$) when the setting flow rate signal Qe of the FCS was Qe=100%; the results were 85.4% ($V_2$=1) to 79.7% ($V_2$=4) when Qe=50%; the results were 86.3% ($V_2$=1) to 70.6% ($V_2$=4) when Qe=5%. It is thus possible to detect the malfunction of a valve (releasing not functioning) in any case. A pressure drop rate is obtained by computing the value as (B−A)/A×100%, where B is a flow rate output signal Qo of the FCS after completing the process, and A is a value of a flow rate output signal Qo' after 0.2 sec at the time of a multi-step (see FIG. 8(*a*)).

Feasibility of Industrial Use

The present invention can be applied to any gas supply facility as long as a pressure type flow control apparatus FCS is being used. Releasing operations of a valve on the downstream side of a throttle mechanism of a pressure type flow control apparatus FCS can be accurately detected with the conditions of changes of a flow rate output signal Qo when a flow rate setting input Qe of a pressure type flow control apparatus FCS is changed.

The invention claimed is:

1. A method for detecting malfunction of a first valve on a downstream side of a throttle mechanism of a pressure type flow control apparatus of a gas supply facility, wherein the method comprises the steps of:
   (a) adjusting fluid pressure $P_1$ on an upstream side of the throttle mechanism to drive a flow rate control signal Qy towards zero, by the steps of
      computing a flow rate Qf of fluid passing through the throttle mechanism using the fluid pressure $P_1$ on the upstream side of the throttle mechanism; and
      operating a control valve on the upstream side of the throttle mechanism by setting the flow rate control signal Qy to a difference between the computed value of the flow rate Qf of the fluid and a flow rate setting value Qe that is inputted to the pressure type flow control apparatus;
   (b) outputting the computed value of the flow rate Qf of the fluid as a flow rate output signal Qo;
   (c) outputting the flow rate output signal Qo, proportional to the fluid pressure $P_1$ on the upstream side of the throttle mechanism, at all times as long as the fluid pressure $P_1$ exists, even in a state wherein the upstream side of the throttle mechanism is closed;
   (d) releasing the first valve on the downstream side of the throttle mechanism of the pressure type flow control apparatus;
   (e) changing the flow rate setting value Qe inputted to the pressure type flow control apparatus;
   (f) detecting magnitude of change ΔV of the flow rate output signal Qo while the flow rate setting signal Qe changes; and
   (g) determining that releasing operations of the first valve on the downstream side of the throttle mechanism are functioning normally when the magnitude ΔV of change of the flow rate output signal Qo is found to be above a predetermined value, and determining that the releasing operations are malfunctioning when the magnitude ΔV of change is found to be below the predetermined value.

2. A method for detecting malfunction of a first valve on the downstream side of the throttle mechanism of the pressure type flow control apparatus as claimed in claim 1, wherein, when the flow rate setting value Qe is inputted to the pressure type flow control apparatus, a flow setting value Qe' larger than a steady-state flow rate setting value Qe", or a flow rate setting value Qe' smaller than the steady-state flow rate setting value Qe", is inputted as the flow rate setting value Qe.

3. A method for detecting malfunction of the first valve on the downstream side of the throttle mechanism of the pressure type flow control apparatus as claimed in claim 2, wherein the throttle mechanism is selected from the group consisting of an orifice or a sonic nozzle.

4. A method for detecting malfunction of the first valve on the downstream side of the throttle mechanism of the pressure type flow control apparatus as claimed in claim 1, wherein the throttle mechanism is selected from the group consisting of an orifice or a sonic nozzle.

5. A method for detecting malfunction of a first valve on the downstream side of a throttle mechanism of a pressure type flow control apparatus of a gas supply facility, wherein the method comprises the steps of:
   (a) adjusting fluid pressure $P_1$ on an upstream side of the throttle mechanism to drive a flow rate control signal Qy towards zero by the steps of
      computing flow rate Qf of fluid passing through the throttle mechanism using the fluid pressure $P_1$ on the upstream side of the throttle mechanism; and
      operating a control valve on the upstream side of the throttle mechanism by setting the flow rate control signal Qy to a difference between the computed value of the flow rate Qf of the fluid and a flow rate setting value Qe that is inputted to the pressure type flow control apparatus;
   (b) outputting the computed value of the flow rate Qf of the fluid as a flow rate output signal Qo;
   (c) outputting the flow rate output signal Qo, proportional to the fluid pressure $P_1$ on the upstream side of the throttle mechanism, at all times as long as the fluid pressure $P_1$ exists, even in a state wherein the upstream side of the throttle mechanism is closed;
   (d) closing the first valve downstream of the throttle mechanism of the pressure type flow control apparatus;
   (e) setting the flow rate setting value Qe to be inputted to the pressure type flow control apparatus to zero;

(f) detecting a magnitude $\Delta V$ of change as the flow rate output signal Qo changes after the flow rate setting value Qe has been set to zero; and (g) determining that releasing operations of the first valve on the downstream side of the throttle mechanism are functioning normally when the magnitude $\Delta V$ of changes of the flow rate output signal Qo is found to be above a predetermined value, and determining that the releasing operations are malfunctioning when the magnitude $\Delta V$ of changes is found to be below the predetermined value.

6. A method for detecting malfunction of the first valve on the downstream side of the throttle mechanism of the pressure type flow control apparatus as claimed in claim 5, wherein the throttle mechanism is selected from the group consisting of an orifice or a sonic nozzle.

7. A method for detecting malfunction of the first valve on the downstream side of the throttle mechanism of the pressure type flow control apparatus as claimed in claim 5, wherein the flow rate setting value Qe to be inputted to the pressure type flow control apparatus is set to zero concurrently with closure of the first valve on the downstream side of the throttle mechanism or is set to zero with a delay of a given time $\Delta t$ after closure of the first valve.

8. A method for detecting malfunction of the first valve on the downstream side of the throttle mechanism of the pressure type flow control apparatus as claimed in claim 7, wherein the throttle mechanism is selected from the group consisting of an orifice or a sonic nozzle.

9. A method for detecting malfunction of a first valve downstream of a throttle mechanism of a pressure type flow control apparatus in a gas supply facility, wherein the method comprises the steps of:

(a) adjusting fluid pressure $P_1$ on an upstream side of the throttle mechanism to drive a flow rate control signal Qy towards zero, by the steps of computing a flow rate Qf of fluid passing through the throttle mechanism using the fluid pressure $P_1$ upstream of the throttle mechanism; and operating a control valve on the upstream side of the throttle mechanism by setting the flow rate control signal Qy to a difference between the computed value of the flow rate Qf of the fluid and a flow rate setting value Qe that is inputted to the pressure type flow control apparatus;

(b) outputting the computed value of the flow rate Qf of the fluid as a flow rate output signal Qo;

(c) outputting the flow rate output signal Qo, proportional to the fluid pressure $P_1$ on the upstream side of the throttle mechanism, at all times as long as the fluid pressure $P_1$ exists, even in a state wherein the upstream side of the throttle mechanism is closed;

(d) releasing the first valve downstream of the throttle mechanism of the pressure type flow control apparatus;

(e) inputting the flow rate setting value Qe to the pressure type flow control apparatus;

(f) detecting a magnitude $\Delta V$ of changes of the flow rate output signal Qo after the first valve on the downstream side of the throttle mechanism has been released; and (g) determining that releasing operations of the first valve on the downstream side of the throttle mechanism are functioning normally when the magnitude $\Delta V$ of changes of the flow rate output signal Qo is found to be above a predetermined value, and determining that the releasing operations are malfunctioning when the magnitude $\Delta V$ of changes is found to be below the predetermined value.

10. A method for detecting malfunction of the first valve on the downstream side of the throttle mechanism of the pressure type flow control apparatus as claimed in claim 9, wherein the throttle mechanism is selected from the group consisting of an orifice or a sonic nozzle.

11. A method for detecting malfunction of the first valve on the downstream side of the throttle mechanism of the pressure type flow control apparatus as claimed in claim 9, wherein a magnitude of a drop rate of the flow rate output signal Qo is detected by inputting the flow rate setting value Qe to the pressure type flow control apparatus with a delay of a predetermined time $\Delta t$ after transmitting a command to release the first valve on the downstream side of the throttle mechanism.

12. A method for detecting malfunction of the first valve on the downstream side of the throttle mechanism of the pressure type flow control apparatus as claimed in claim 11, wherein the throttle mechanism is selected from the group consisting of an orifice or a sonic nozzle.

* * * * *